United States Patent
Chu et al.

(10) Patent No.: US 7,334,118 B2
(45) Date of Patent: Feb. 19, 2008

(54) METHOD FOR RESETTING A PROCESSOR INVOLVES RECEIVING CPU RESET TRIGGER SIGNAL FROM BIOS

(75) Inventors: Hsiu-Ming Chu, Taipei (TW); Kuan-Jui Ho, Taipei (TW)

(73) Assignee: Via Technologies, Inc., Taipei (TW)

( * ) Notice: Subject to any disclaimer, the term of this patent is extended or adjusted under 35 U.S.C. 154(b) by 378 days.

(21) Appl. No.: 11/126,131

(22) Filed: May 10, 2005

(65) Prior Publication Data
US 2006/0112263 A1 May 25, 2006

(30) Foreign Application Priority Data
Nov. 25, 2004 (TW) ............... 93136270 A

(51) Int. Cl.
*G06F 15/177* (2006.01)
(52) U.S. Cl. .............................. 713/1; 713/2
(58) Field of Classification Search .......... 713/1
See application file for complete search history.

(56) References Cited

U.S. PATENT DOCUMENTS

| | | | |
|---|---|---|---|
| 5,996,038 A * | 11/1999 | Looi et al. ................. 710/312 |
| 6,370,644 B1 * | 4/2002 | LaBerge .......................... 713/1 |
| 6,836,848 B2 * | 12/2004 | Yu et al. ...................... 713/300 |
| 6,988,214 B1 * | 1/2006 | Verdun ......................... 713/320 |
| 7,010,724 B1 * | 3/2006 | Hicok ........................... 714/39 |
| 7,055,064 B2 * | 5/2006 | Lin ............................... 714/23 |
| 7,165,172 B1 * | 1/2007 | Hamilton et al. .............. 713/1 |
| 2003/0145191 A1 * | 7/2003 | Park .............................. 713/1 |
| 2005/0060617 A1 * | 3/2005 | Huang et al. ................. 714/34 |

FOREIGN PATENT DOCUMENTS

CN 1455307 * 11/2003

\* cited by examiner

*Primary Examiner*—Chun Cao
(74) *Attorney, Agent, or Firm*—Thomas, Kayden, Horstemeyer & Risley

(57) ABSTRACT

A computer reset method activated by a South Bridge to directly reset a Central Processing Unit (CPU). First, a trigger signal is received. A CPU reset signal is delivered by the South Bridge when receiving the trigger signal. Thereafter, the CPU is reset when receiving the CPU reset signal from the South Bridge via a North Bridge.

12 Claims, 3 Drawing Sheets

METHOD FOR RESETTING A PROCESSOR INVOLVES RECEIVING CPU RESET TRIGGER SIGNAL FROM BIOS

BACKGROUND

The invention relates to basic input output systems and computer reset methods, in particular, to a rapid reset method that only resets the Central Processing Unit.

Central Processing Units (CPU) often need to reset. For example, when a frequency ratio is changed, or when the power state is restored from a suspend mode to a normal mode, a CPU reset is required.

FIG. 1 shows a conventional computer system architecture and signal flows thereof. The computer system 100 comprises a processor 102, a Northbridge 104, a Southbridge 106, and a Read Only Memory (ROM) device 108. The bus for the Northbridge 104 and Southbridge 106, can be Peripheral Connection Interface (PCI), or specific standards such as VIA® V-Link or Intel® ICH. The Northbridge 104 couples to the processor 102 via Front Side Bus (FSB), to memory devices (not shown) via a memory bus, and to graphic units (not shown) via Accelerated Graphic Ports (AGP). Conventionally, when the processor 102 requires a reset, the Northbridge 104 cannot actively perform CPU reset. Conversely, the Southbridge 106 must deliver a system reset signal PCI_RST#, to completely reset the computer system, thereby triggering the Northbridge 104 to deliver the CPU reset signal CPU_RST# to the processor 102. As shown in FIG. 1, the system reset signal PCI_RST# can be activated by a trigger 110, or by Basic Input Output System (BIOS) programmed in the computer system 100. The system reset signal PCI_RST# is delivered to units coupling to the PCI bus, and to the Northbridge 104 via the V-Link bus. When the Northbridge 104 receives the system reset signal PCI_RST#, corresponding reset signals RST# are individually generated by the Northbridge 104, and delivered to memory devices and graphic units respectively. Simultaneously, a CPU reset signal CPU_RST# is generated and delivered to the processor 102 via the Front Side Bus (FSB). Therefore the only way to reset the processor 102, is to completely reset the computer system 100.

In this method, however, the Northbridge 104 and Southbridge 106 are also reset, and data stored in the registers of the Northbridge 104 are lost, which is undesirable. Unrecoverable problems may occur when the computer system 100 returns from a power saving mode. Thus an initialization procedure is required to help the computer system 100 return to normal operation, increasing implementation complexity and cost.

SUMMARY

An embodiment of the invention provides a reset method for use in a computer system comprising a Southbridge, a Northbridge and a processor. The system reset method comprises the following steps. First, a trigger signal is provided. A CPU reset signal is delivered by the Southbridge to the Northbridge after receiving the trigger signal, and is relayed to the processor. Thereafter, the processor is reset when receiving the CPU reset signal.

The Southbridge comprises a plurality of sideband pins coupling to the processor to provide startup options. The processor is reset in a mode relative to the startup options determining the frequency ratio of the processor. The trigger signal is generated by a Basic Input Output System (BIOS).

The reset method further comprises backing up the processor register data before the Northbridge delivers the CPU reset signal to the processor, and restoring the registers after the processor is reset.

Another embodiment of the invention provides the described computer system, performing the described method. A further embodiment provides the described BIOS, processing the described method on the computer system described.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

Figure 1:
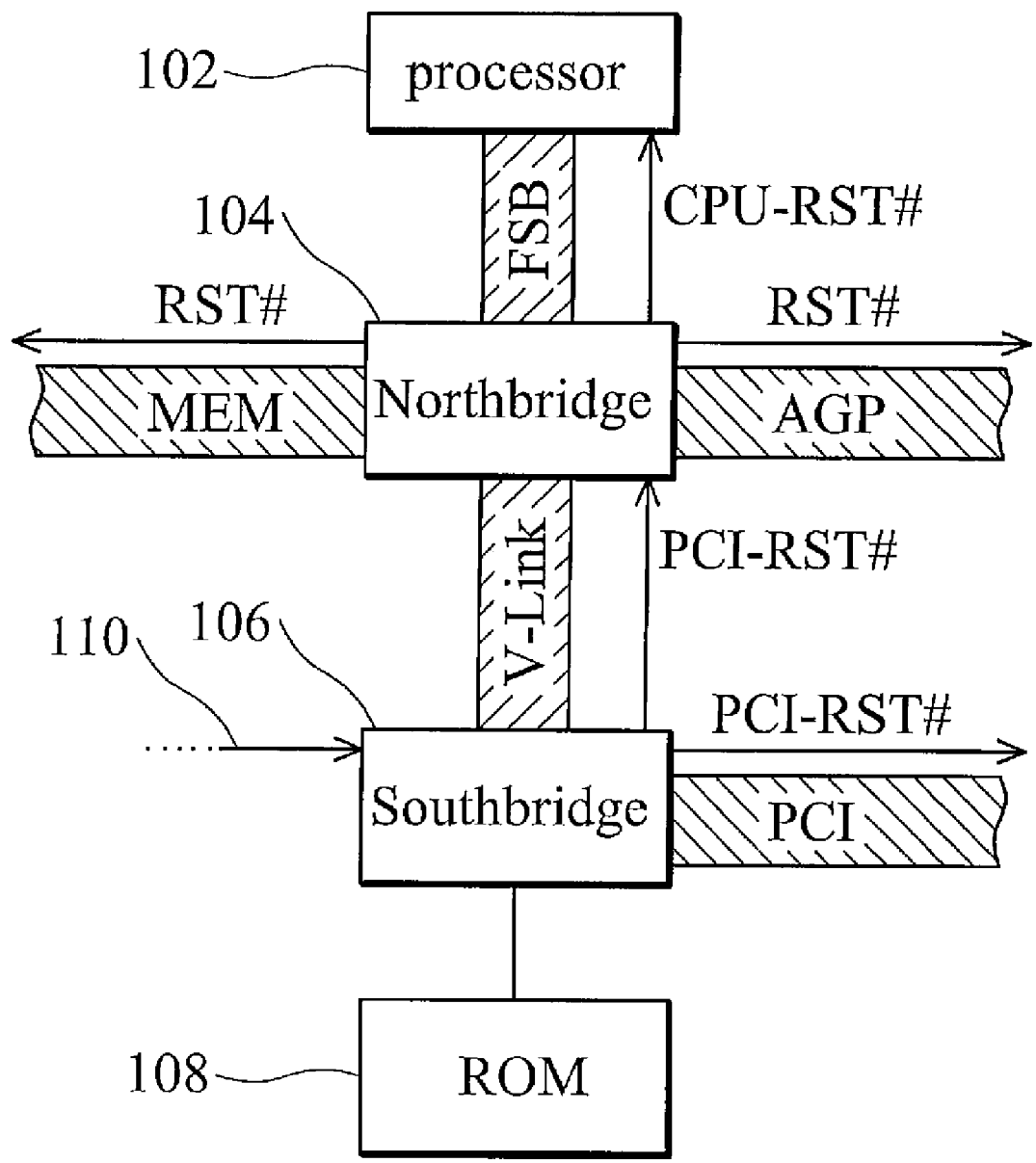
FIG. 1 shows a conventional computer system and signal flows therein.
Figure 2:
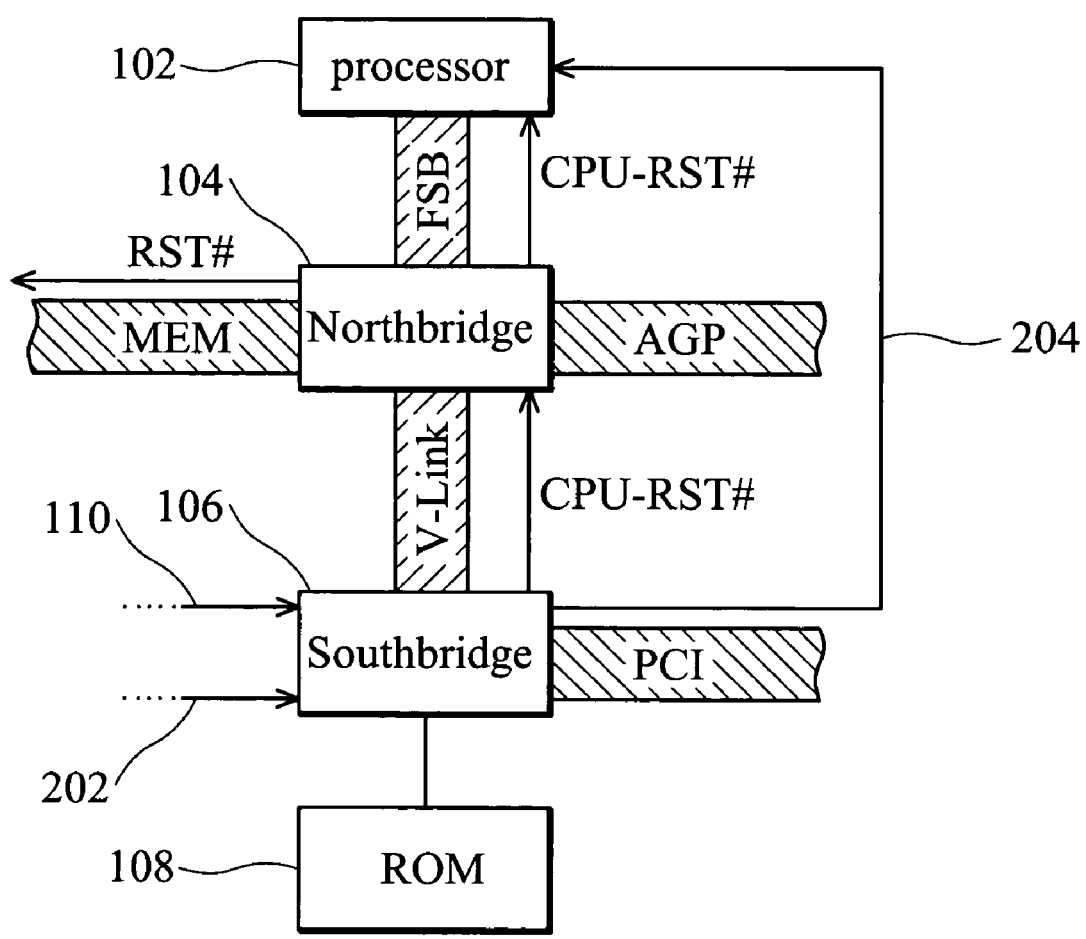
FIG. 2 shows an embodiment of a computer system and signal flows therein.

FIG. 2 shows an embodiment of a computer system 200 and signal flows therein. The computer system 200 comprises a processor 102, a Northbridge 104, a Southbridge 106 and a ROM device 108. Additionally, the computer system 200 is capable of receiving a CPU reset trigger 202, for directly resetting the processor 102 without affecting other units therein. The sideband pins 204, conforming to earlier processor specifications, are capable of providing specific startup options such as frequency ratio. When the Southbridge 106 receives the CPU reset trigger 202, a signal CPU_RST# is delivered directly to the Northbridge 104 via the V-Link bus. When the Northbridge 104 receives the signal CPU_RST#, relay it to the processor 102 via the Front Side Bus (FSB), thereby the processor 102 is reset. During reset of processor 102, the potentials on the sideband pins 204, provided by the Southbridge 106, are referenced as startup options for the processor 102. For example, the number of sideband pins 204 may be four, each indicating a bit 0 or 1, providing the frequency ratio of the processor 102 with 16 variations, thus the processor 102 can read the bits when reset and operate on the frequency accordingly. In another case, the Northbridge 104 also provides some startup options such as Hyper-Threading enablement to the processor 102 during reset. The reset procedure only resets the processor 102, and does not affect other units of the computer system 200, therefore no additional initialization procedures are required for the Northbridge 104, and data in the registers is not lost.

Similar to trigger 110, the CPU reset trigger 202 can be triggered externally, or generated by the program in the system. For example, when the BIOS adjusts the frequency ratio, and when the computer system is returning from a power saving mode to normal mode, the CPU reset trigger 202 is generated.

In another case, before the Northbridge 104 relays the CPU reset signal CPU_RST# to the processor 102, data in the registers of processor 102 can be backed up in the memory devices. When the processor 102 reset is complete, the data are restored to the registers thereto.

Figure 3:
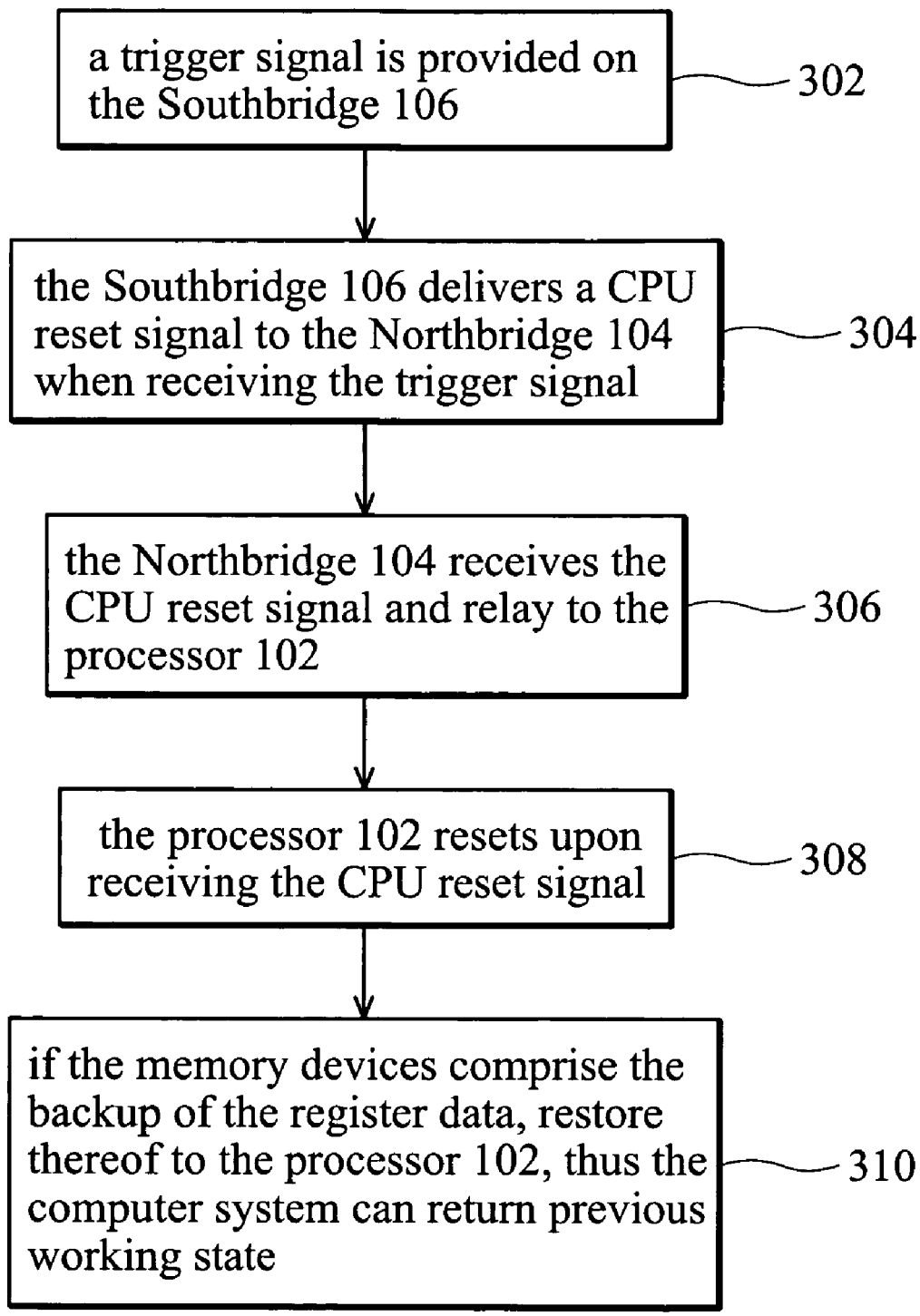
FIG. 3 is a flowchart of an embodiment of the reset method.

FIG. 3 is a flowchart of an embodiment of the reset method. First, in step 302, a trigger signal is provided on the Southbridge 106. The trigger signal only resets the processor, not the entire computer system. In step 304, the Southbridge 106 delivers a CPU reset signal to the Northbridge 104 when receiving the trigger signal. The communication of the Southbridge 106 and Northbridge 104 is performed using a specific protocol capable of distinguishing the difference between the CPU reset signal and the system reset signal, thus the processor 102 can be individually reset. In step 306, the Northbridge 104 receives and relays the CPU reset signal to the processor 102. Alternatively, the Northbridge 104 backs up the processor register data in the processor 102 to the memory devices before relaying the CPU reset signal, and then delivers the CPU reset signal to reset the processor 102. In step 308, the processor 102 is reset upon receiving the CPU reset signal. For some earlier processor 102 types, a plurality of sideband pins 204 coupling between the Southbridge 106 and the processor 102 are supported, and some specific startup options are provided by the Southbridge 106 to the processor 102 via the sideband pins 204. The processor 102 operates in a mode corresponding to the startup options provided after reset. For example, if the sideband pins 204 are used to determine frequency ratio, the processor 102 operates at a corresponding frequency accordingly. Additionally, a plurality of native pins coupling between the Northbridge 104 and processor 102, also provide some startup options based on the processor implementation guide, such as Hyper-Threading enablement. In step 310, if present, the memory devices restore the backed up register data to the processor 102, thus the computer system can return to the previous working state.

In summary, the invention simplifies the CPU reset procedure, avoids unnecessary system re-initialization and data loss, satisfies specific requirements such as rapid resetting and frequency ratio adjustment.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A reset method, for use in a computer system comprising a Southbridge, a Northbridge and a processor, the system reset method comprising:
   providing a trigger signal;
   by the Southbridge, delivering a CPU reset signal after receiving the trigger signal;
   by the Northbridge, relaying the CPU reset signal to the processor when receiving it;
   backing up processor register data before the Northbridge delivers the CPU reset signal to the processor;
   resetting the processor when receiving the CPU reset signal; and
   restoring the register data after the processor is reset.

2. The reset method as claimed in claim 1, wherein:
   the Southbridge comprises a plurality of sideband pins coupling to the processor to provide startup options; and
   the processor is reset in a mode relative to the startup options.

3. The reset method as claimed in claim 2, wherein the options determine a frequency ratio of the processor.

4. The reset method as claimed in claim 3, wherein the trigger signal is generated by a Basic Input Output System (BIOS).

5. A computer system, comprising:
   a Southbridge, delivering a CPU reset signal after receiving a trigger signal;
   a Northbridge, coupled to the Southbridge for receiving the CPU reset signal; and
   a processor, coupled to the Northbridge, receiving the CPU reset signal to reset; wherein:
   the Southbridge comprises a plurality of sideband pins coupling to the processor for providing startup options;
   the processor resets in a mode relative to the startup options; and
   the startup options determine a frequency ratio of the processor.

6. The computer system as claimed in claim 5, further comprising a Basic Input Output System (BIOS) for generating the trigger signal.

7. The computer system as claimed in claim 6, further comprising a memory device for backing up processor register data before the Northbridge delivers the CPU reset signal to the processor; wherein the register data are restored after the processor is reset.

8. A Basic Input Output System (BIOS), controlling a computer system comprising a Southbridge, a Northbridge and a processor, the Basic Input Output System generates a trigger signal causing the computer system to execute the following processes:
   the Southbridge delivers a CPU reset signal after receiving the trigger signal;
   the Northbridge, coupled to the Southbridge, relays the CPU reset signal to the processor when receiving the CPU reset signal, and backs up processor register data before the Northbridge delivers the CPU reset signal to the processor;
   the processor, coupled to the Northbridge, is reset when receiving the CPU reset signal from Northbridge; and
   the Northbridge restores the register data after the processor is reset.

9. The Basic Input Output System as claimed in claim 8, wherein the Southbridge comprises a plurality of sideband pins coupling to the processor, and the Basic Input Output System further:
   providing startup options; and
   delivering the startup options from the Southbridge to the processor through the sideband pins; wherein
   the processor is reset in a mode relative to the startup options.

10. The Basic Input Output System as claimed in claim 9, wherein the startup options determine a frequency ratio of the processor.

11. The Basic Input Output System as claimed in claim 8, wherein the computer system further comprises a memory device for backing up the processor register data.

12. The Basic Input Output System as claimed in claim 8, wherein the computer system further comprises a read only memory device for storing the Basic Input Output System.

* * * * *